Nov. 1, 1932.                C. L. GEORGE                1,885,430
                       ENDLESS BELT TRACTION DEVICE
                          Filed Aug. 20, 1928
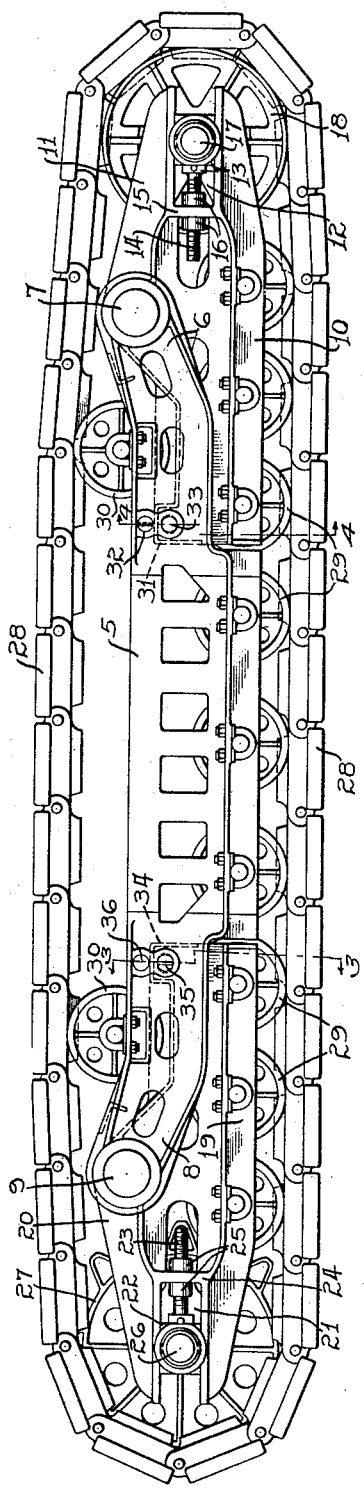
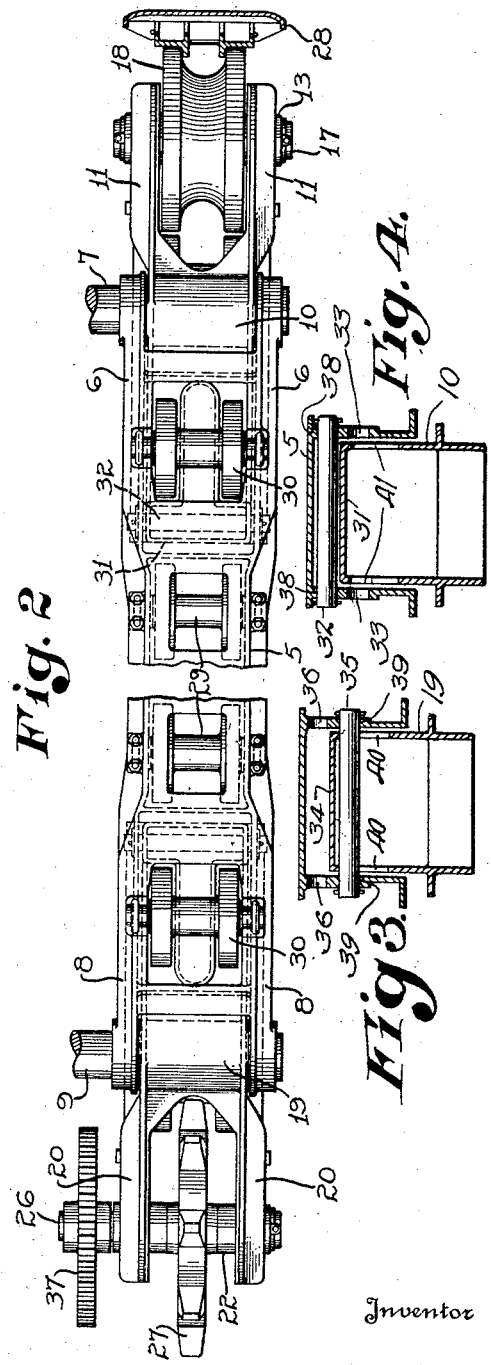
Inventor
Charles L. George
By Owen & Owen
Attorn Patented Nov. 1, 1932

1,885,430

UNITED STATES PATENT OFFICE

CHARLES L. GEORGE, OF FINDLAY, OHIO, ASSIGNOR TO THE BUCKEYE TRACTION DITCHER COMPANY, OF FINDLAY, OHIO, A CORPORATION OF OHIO

ENDLESS BELT TRACTION DEVICE

Application filed August 20, 1928. Serial No. 300,739.

This invention relates to that class of machines or vehicles which are supported and propelled over the ground through the medium of endless belt traction elements, commonly known as alligator wheels, with special reference to the frame structures on which the belts travel.

In using this type of traction in connection with cranes, power shovels, skimmer scoops and other machines wherein there may be a heavy load in front, there is a tendency for the front portions of the traction elements to nose downwardly, causing the rear portions thereof to rise so that they have little or no contact with the ground. The primary object of the present invention is to provide a construction which will obviate this difficulty and insure, as far as possible, a normal full surface contact of a number of the tread links with the ground under all conditions. With this end in view, the frame structure about which the tread travels, is so constructed that the front portion thereof is permitted to have a limited rocking movement, with respect to the main part of the frame structure, about the front axle as an axis. In its preferred embodiment the rear portion of the frame structure is permitted to have a similar rocking movement in the opposite direction.

The detailed construction of the invention and its mode of operation will be more specifically explained in connection with the accompanying drawing, which illustrates one embodiment thereof.

In the drawing:—

Figure 1 is a side elevation of the invention.

Fig. 2 is a plan view of the same, with only a portion of the belt shown in section.

Fig. 3 is a section taken on the line 3—3 of Fig. 1.

Fig. 4 is a section taken on the line 4—4 of Fig. 1.

The traction device, which constitutes the subject matter of my invention, comprises a main frame 5 having side rails which extend forwardly, as shown at 6, and are mounted at their forward ends on a transverse shaft 7, which is secured to the front part of the frame of the machine and which may be termed the front axle. The rear portions of the side rails, as shown at 8, are mounted on a transverse shaft 9, which may be termed the rear axle.

A front end frame 10 is mounted on the axle 7 between the forward end portions 6 of the side rails and has a rocking movement thereon. The frame 10 is formed with forwardly projecting side portions 11 having slots 12 in which bearing boxes 13 are mounted for longitudinal adjustment. For effecting the adjustment, each bearing box has a threaded stem 14 connected therewith and extending through a web 15 to which it is adjustably secured by nuts 16. A shaft 17 is mounted in the boxes 13 and supports a wheel 18.

In the preferred construction, a rear end frame 19 is similarly mounted for limited rocking movement on the axle 9 between the rear end portions 8 of the main frame. The rear end frame is formed with rearwardly extending portions 20 having slots 21 in which bearing boxes 22 are mounted for longitudinal adjustment. For effecting this adjustment, each box has a threaded stem 23 connected therewith and extending through a web 24 in which it is secured by nuts 25. A shaft 26 is mounted in the boxes 22 and carries a sprocket wheel 27.

An endless belt tread 28 is mounted on the wheels 18 and 27 and is driven by the latter. The lower flight of the belt 28 is supported by numerous rollers 29 mounted in the lower portions of the main frame 5 and the end frames 10 and 19. The upper flight of the belt 28 is supported by rollers 30 mounted in the upper part of the main frame.

The front end frame 10 extends rearwardly within the main frame 5 and is formed with a seat, as indicated at 31, which normally rests against an abutment in the form of a pin 32 mounted in bearings 38 in the frame 5. Similarly, the rear end frame 19 extends forwardly within the main frame, as indicated at 34, where it is formed with a seat which normally rests against an abutment in the form of a pin 35 mounted in bearings 39 in the frame 5 and extending through slots 40 in the frame 19.

For travelling along the road, with the pin 32 in the position shown in Fig. 4, the end frame 10 may be locked to the main frame 5 by inserting an additional pin (not shown) in the bearings 33 in the main frame and through the slots 41 in the frame 10 immediately below the seat 31. Likewise with the pin 35 in the position shown in Fig. 3, the frame 19 may be locked to the main frame by inserting an additional pin (not shown) in the bearings 36 in the main frame immediately above the seat 34. The sprocket wheel 27 and the belt 28 are adapted to be driven through the medium of a sprocket gear 37 secured to the shaft 26 and operatively connected with the motor on the main frame of the machine.

In the normal operation of the machine, as it travels forwardly or rearwardly on level ground, although the end frames 10 and 19 are free to oscillate about the respective axles, they will normally be held in alinement with the frame 5 by the weight of the machine on the axles. In excavating or hoisting operations, however, excessive weight is imposed upon the front end of the machine, with a consequent tendency for the front end of the traction frame to nose downwardly. When the entire traction frame is rigid, there is a consequent tendency for the rear part of the frame to tilt upwardly and for the rear portion of the traction belt to leave the ground. With the present construction, however, if the supporting axle 9 is raised, the full load of the machine is transferred to the supporting axle 7, but a substantial number of tread links beneath the frame 10, which is substantially symmetrical about the supporting axle 7, remain in full normal surface contact with the ground and receive the load, with substantially no loss of traction and with no material change from normal operation. Simultaneous rocking of the end frames 10 and 19 about the respective axles may take place without any appreciable change in the distance between the shafts 17 and 26 or in the length of the orbit through which the traction belt travels. Normally, with the pin 35 mounted as shown in Fig. 3, the rocking movement of the frame 19 is limited to a small angle and, if the traction belt is substantially taut and of constant length, the movement of the frame 10 is similarly limited. By the present construction, therefore, the excessive load on the front end of the machine has substantially no effect on the efficiency of the traction device.

While I have shown and described the detailed construction of the invention in its present embodiment, it is to be understood that this is merely for the purpose of illustration, and that the invention includes all such modifications as may fall within the scope of the appended claims.

What I claim is:

1. In combination with front and rear load supporting axles of a vehicle, (a traction device comprising a central main frame having the ends of said front and rear axles mounted in the ends thereof, end frames pivoted to swing about said axles, the respective end frames projecting forwardly and rearwardly from the main frame and normally in alinement therewith, the projecting end of one end frame being swingable downwardly and the projecting end of the other being swingable upwardly from their normal relation to the main frame, means positively preventing the swinging of the respective end frames in the other direction from normal position, an endless belt tread mounted for travel about said frames, and means for driving said tread.

2. In combination with front and rear load supporting axles of a vehicle, a traction device comprising a central main frame having the ends of said front and rear axles mounted in the ends thereof, end frames mounted for rocking movement on the respective axles and projecting forwardly and rearwardly thereof respectively, rollers mounted in the lower portions of said frames, an endless belt tread mounted to travel on said frames with its lower flight guided beneath said rollers, the normal position of the end frames being such that the lower flight of the tread is straight, means for driving said tread, and abutments positively preventing the projecting portion of one end frame from rocking upwardly and the other from rocking downwardly from normal position.

3. In a traction device, a main frame, front and rear axles on which said frame is mounted, an end frame connected by an axle to the main frame at each end of the latter, an endless belt tread mounted for travel about the frames, and means mounted in one of said end frames for driving said tread, the end frames being normally held in alinement with the main frame by the load on the axles but having a rocking movement on their respective axles in response to a shifting of the load, whereby the main frame may flex upwardly while a substantial portion of the tread beneath the front end frame has a full normal surface contact with the ground, and means for limiting said rocking movement.

4. In combination with front and rear load supporting axles of a vehicle, a traction device comprising a main frame having the ends of said front and rear axles mounted in the ends thereof, end frames mounted for rocking movement on the respective axles and each projecting substantially equal distances forwardly and rearwardly from its axle, an endless belt tread, rollers in the lower portions of the respective frames for guiding the lower flight of the tread in its travel, and means for driving said tread, said rollers being so arranged that they bear against the tread throughout its lower flight, with the frames held in alinement by the weight on the axles, as the device travels normally on a level surface.

5. In combination with front and rear load supporting axles of a vehicle, a traction device comprising a main frame having the ends of said front and rear axles journaled in the ends thereof, end frames mounted for rocking movement on the respective axles in response to shifting of the load and each projecting forwardly and rearwardly from the axle on which it is mounted, an endless belt tread mounted on said frames, and means for driving said tread.

6. In combination with front and rear load supporting axles of a vehicle, a traction device comprising a main frame having the ends of said front and rear axles journaled in the ends thereof, end frames mounted for rocking movement on the respective axles, an endless belt tread mounted for travel about said frames, means for driving said tread, said end frames constituting a supporting medium for said axles and being normally held in alinement with the main frame by the load on the axles when the vehicle is on a plane surface, and means limiting the relative upward rocking movement of the main frame with respect to one of the end frames in response to an overbalancing of the load in the direction of the other end frame.

7. In tractor mechanism of the class described, endless treads, a frame, endless tread engaging means carried thereby, including supporting wheels fixed as to vertical movement relative to said frame, self-positioning tread supporting wheels carried by the frame beyond the fixed supporting wheels at both ends of the tractor and movable vertically relative to said frame, said endless treads engaging all of said wheels, and means for resisting the free upward movement of said movable wheels.

8. In tractor mechanism of the class described, a frame, an endless tread, and a complete tread supporting unit on each side of said frame, each comprising at least a pair of tread engaging and supporting rollers fixed against vertical movement with respect to the frame, a movable tread loop engaging roller carried by the frame in alignment with and spaced from said fixed rollers at each end of the tread unit, and means for resisting the free upward movement of the movable rollers.

9. A tractor mechanism as in claim 8 wherein the means for resisting the movement of said movable tread engaging rollers is yielding.

10. A tractor mechanism as in claim 8 wherein the means for resisting the movement of said movable tread engaging rollers at each end includes a roller arranged to engage the ground engaging portion of the tread between the movable tread engaging rollers and the adjacent rollers fixed against vertical movement.

11. A tractor mechanism as in claim 8 wherein the means for resisting the movement of the movable end rollers includes a pivoted arm secured to the frame and carrying a movable end roller, and means effective upon said arm and engaging the ground stretch of the tread, between such end roller and the next adjacent rollers fixed against vertical movement.

12. In tractor mechanism of the class described, a frame, and a complete tread unit on each side thereof each comprising at least a pair of tread engaging and supporting rollers fixed against vertical movement with respect to the frame, an endless tread engaging said fixed rollers and extending at both ends beyond the same in end loops, an equalizer axle fixed against vertical movement in the frame and within each end loop, and an equalizer unit upon each axle and comprising a lever pivoted intermediate its ends to one of said axles, a loop engaging roller carried by one arm of said lever and a bottom tread stretch engaging roller carried by the other arm of said lever.

13. A tractor mechanism as in claim 12 wherein the equalizer is provided with means for limiting its swinging movement about the axle.

14. A tractor mechanism as in claim 12 wherein the equalizer is provided with means for limiting its swinging movement about the axle in both directions.

In testimony whereof I have hereunto signed my name to this specification.

CHARLES L. GEORGE.